United States Patent [19]

Barradas

[11] Patent Number: 4,793,246

[45] Date of Patent: Dec. 27, 1988

[54] ELECTRICALLY OPERATED HOT BEVERAGE MAKER

[76] Inventor: George Barradas, 15 Riverview Ct., Greenwich, Conn. 06830

[21] Appl. No.: 82,588

[22] Filed: Aug. 7, 1987

[51] Int. Cl.⁴ ............................................ A47J 31/10
[52] U.S. Cl. ........................................ 99/307; 99/279; 99/285; 99/304; 99/316
[58] Field of Search .................. 99/279, 285, 293, 300, 99/302 R, 304, 305, 306, 307, 316, 317; 426/433

[56] References Cited

U.S. PATENT DOCUMENTS

| | | | |
|---|---|---|---|
| 1,843,241 | 2/1932 | Pouget | 99/285 |
| 3,696,733 | 10/1972 | Beverett | 99/307 |

FOREIGN PATENT DOCUMENTS

| | | | |
|---|---|---|---|
| 2023596 | 11/1971 | Fed. Rep. of Germany | 99/307 |
| 2308339 | 11/1976 | France | 99/304 |

*Primary Examiner*—Harvey C. Hornsby
*Assistant Examiner*—Stephen F. Gerrity
*Attorney, Agent, or Firm*—Alfred E. Miller

[57] ABSTRACT

A beverage maker for coffee or the like operated electrically and in which the water container is resilient so that it is expandable within the confines of the beverage maker so that a greater beverage capacity is achieved selectively. The beverage is made by pumping up the water from a lower compartment to an upper compartment having the flavored substance therein wherein the water drips through the flavored substance and through apertures in the upper container to an annular receptacle surrounding the expandable water container.

11 Claims, 9 Drawing Sheets

ELECTRICALLY OPERATED HOT BEVERAGE MAKER

This invention relates to an improvement in electrically operated coffee makers, particularly to a hot beverage producer, such as a coffee maker in which the water compartment can be expanded to an upper limit depending upon the amount of coffee required to be brewed at any given time. Thus, the volume of the water compartment can be expanded at will to produce a larger number of cups of coffee.

It is an object of the present invention to provide an electrically operated beverage or coffee maker in which the water receptacle and brewed beverage or coffee are maintained separate at all times within the coffee maker.

It is a further feature of the present invention to provide a water supply which is heated by a heating element located in the bottom of the coffee maker and is further provided with means for pumping or elevating the boiling water to flow through ground coffee beans in the filter arrangement to an annular receptacle which surrounds the periphery of the water container.

It is still another feature of the present invention to provide a coffee maker with an upper compartment for holding a supply of coffee in a filter arrangement, and a lower compartment having an expandable water container and means for heating the water and flowing the same through the coffee in the upper compartment to drip down as brewed coffee to an annular receptacle surrounding the lower compartment, and whereby the upper compartment can be separated and removed from the lower compartment.

It is another object of the present invention to provide a stem cup measuring device in the water compartment which can also be used as a handle for lifting the water container compartment out of the coffee maker.

In order that the present invention will be more clearly understood, it will now be disclosed in greater detail with reference to the accompanying drawings, in which:

FIG. 3b is a top plan view of the support ring and spider shown in FIG. 3a.

Figure 1:
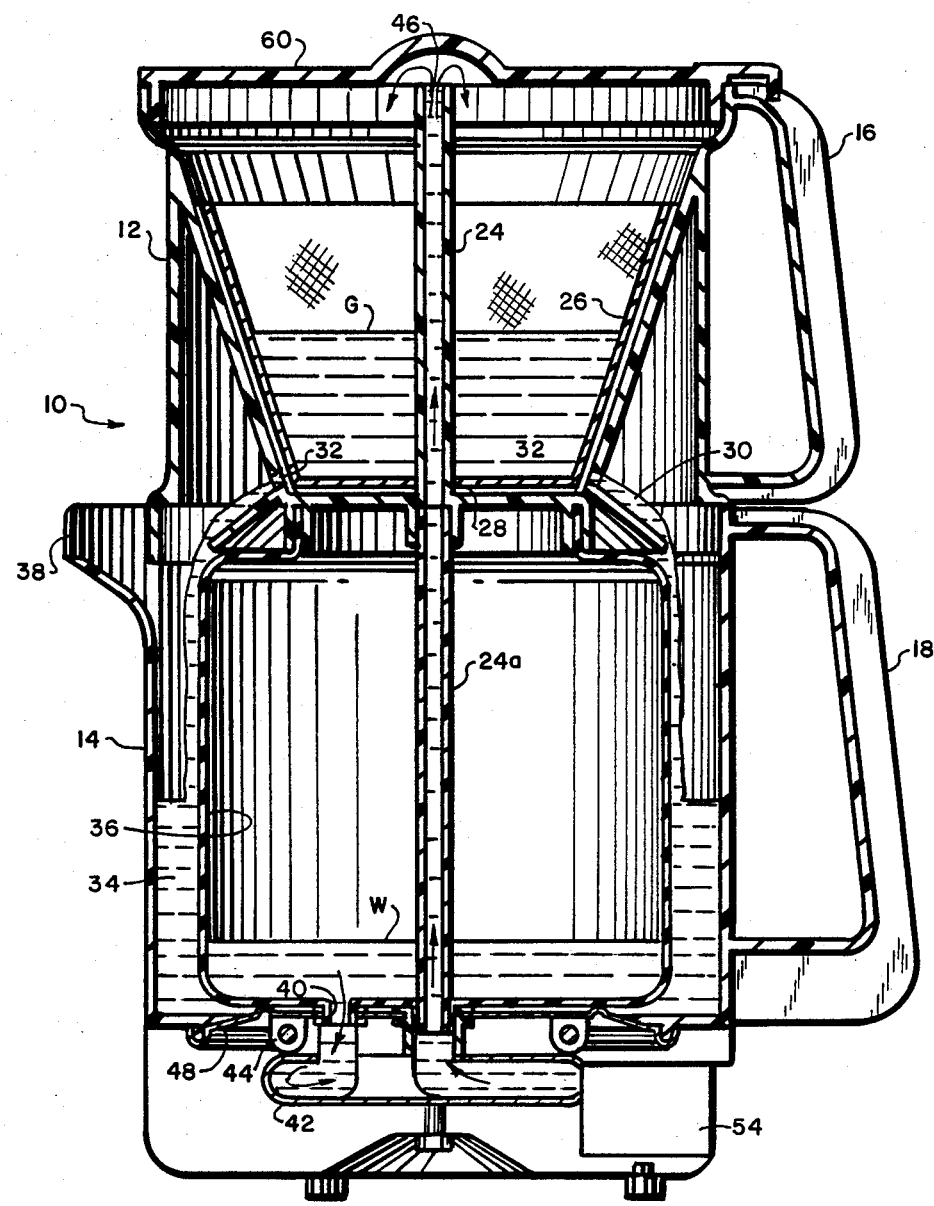
FIG. 1 is a sectional view partly in elevation of the electrically operated hot beverage maker with expandable water compartment in its assembled condition, and constructed in accordance with the teachings of my invention.
Figure 2:
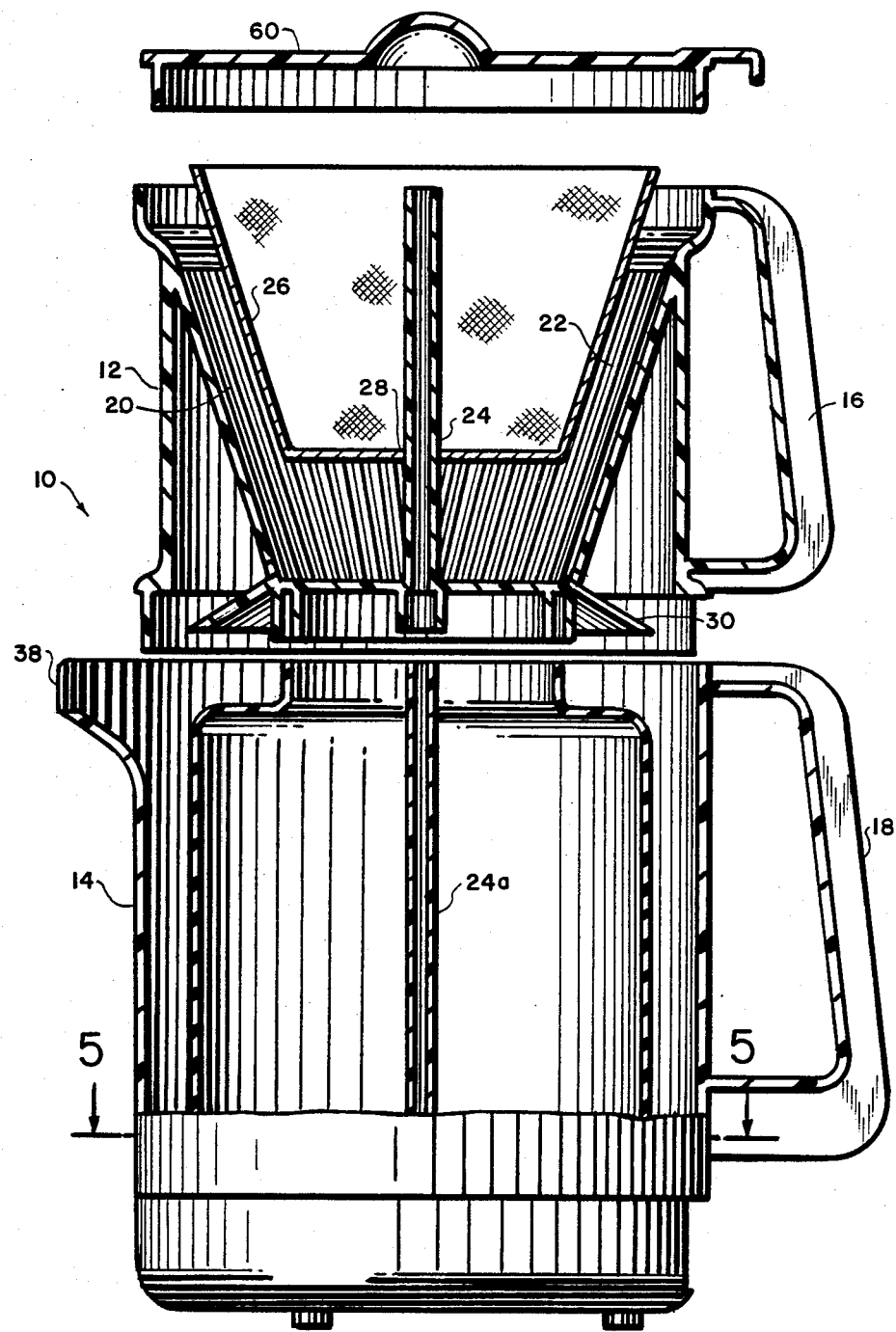
FIG. 2 is an exploded view of the electrically operated hot beverage maker shown in FIG. 1 prior to assembly.

FIGS. 1 and 2 show an electric coffee or other type of hot beverage maker make in accordance with the teachings of my invention and where an automatic drip coffee or other type of beverage maker is shown and referred to generally by the reference numeral 10, which includes an upper compartment 12 and a lower compartment 14. By referring to FIG. 2, it should be evident that the upper and lower compartments 12 and 14 are detachable, and that compartment 12 is provided with handle 16, where lower compartment 14 is provided with a separate handle 18. As is clearly seen in FIG. 2, the upper compartment 12 is provided with a fixed basket 20, having a ribbed interior surface 22. The upper basket 12 also is provided with a central pump or delivery tube 24. As seen in FIGS. 1 and 2, a throwaway or semi-permanent filter cone 26 provided with a central hole 28 is adapted to slide over the delivery tube 24 and seat itself within the correspondingly conical shaped coffee basket 22. The coffee basket 20 is further provided with a flange 30 forming a skirt at the bottom of said coffee basket. Located immediately above the flange or skirt 30 are openings 32 in the coffee basket so that the liquid, or brewed coffee, can pass through by gravity and be deflected by the flange 30 to the peripheral coffee container 34 in the lower compartment 14.

An important feature of the present invention is a provision of an expandable water container 36 in the lower receptacle 14. This water container can be made of silicone, rubber material, or any other suitable expandable substance, and may take a variety of forms or configurations as shown in FIGS. 8-11 to be described hereinafter. The lateral expandability of the water container 36 into the space occupied by the peripheral coffee container 34' is an important feature since this construction and arrangement provides for the water container to accomodate additional water so that more cups of coffee can be made in a given size coffee maker. The water container 36 which is expandable and flexible is supported in the lower container 14 by means of an annular peripheral rim 37 on the mouth of the flexible container which removably hooks into an annular channel 41 of the spider support member 39 on the lower container 14.

Referring to FIG. 2, it will be noted that the lower receptacle 14 is provided with a pouring nozzle 38 and the lower section 24a of the pump, or delivery tube 24 shown in the top receptacle.

Referring now to FIG. 1, it will be seen that the water W in the container 36 flows by gravity through the bottom opening 40 in the container 36 and into a channel 42 in communication with the heating element 44 which is a Calrod or any other suitable electrical heating element. After a period of time, the heating element, which is in heat exchange with the water present in the channel 42, causes the water to boil and pump up through pump and delivery tubes 24, 24a and out the open end 46 of the top of the tube 24 to flow by gravity into and through the coffee grounds G present in the filter basket 26. The coffee is then brewed and the brewed liquid coffee flows by gravity through the holes 32 in the filter basket 26 and is deflected by the flange 30 to fall into the annular coffee receptacle 34 surrounding the periphery of the water container 36. As a result of the present construction, the water in the water container and the brewed coffee are held separate at all times within the electric coffee maker and there is no recycling of the brewed coffee to impair the improved flavor and aroma of the one-pass coffee brew.

As further seen in FIG. 1, a separator member 48 is shown which separates the water container 36 from direct contact with the heater 44. Enlarged views of the spacer member 48 are shown in FIGS. 5 and 6 which is shown provided with a central hole 50 through which the pipe 24a passes, as well as a semi-circular cutout 52, the purpose of which will be explained hereinafter.

Figure 3:
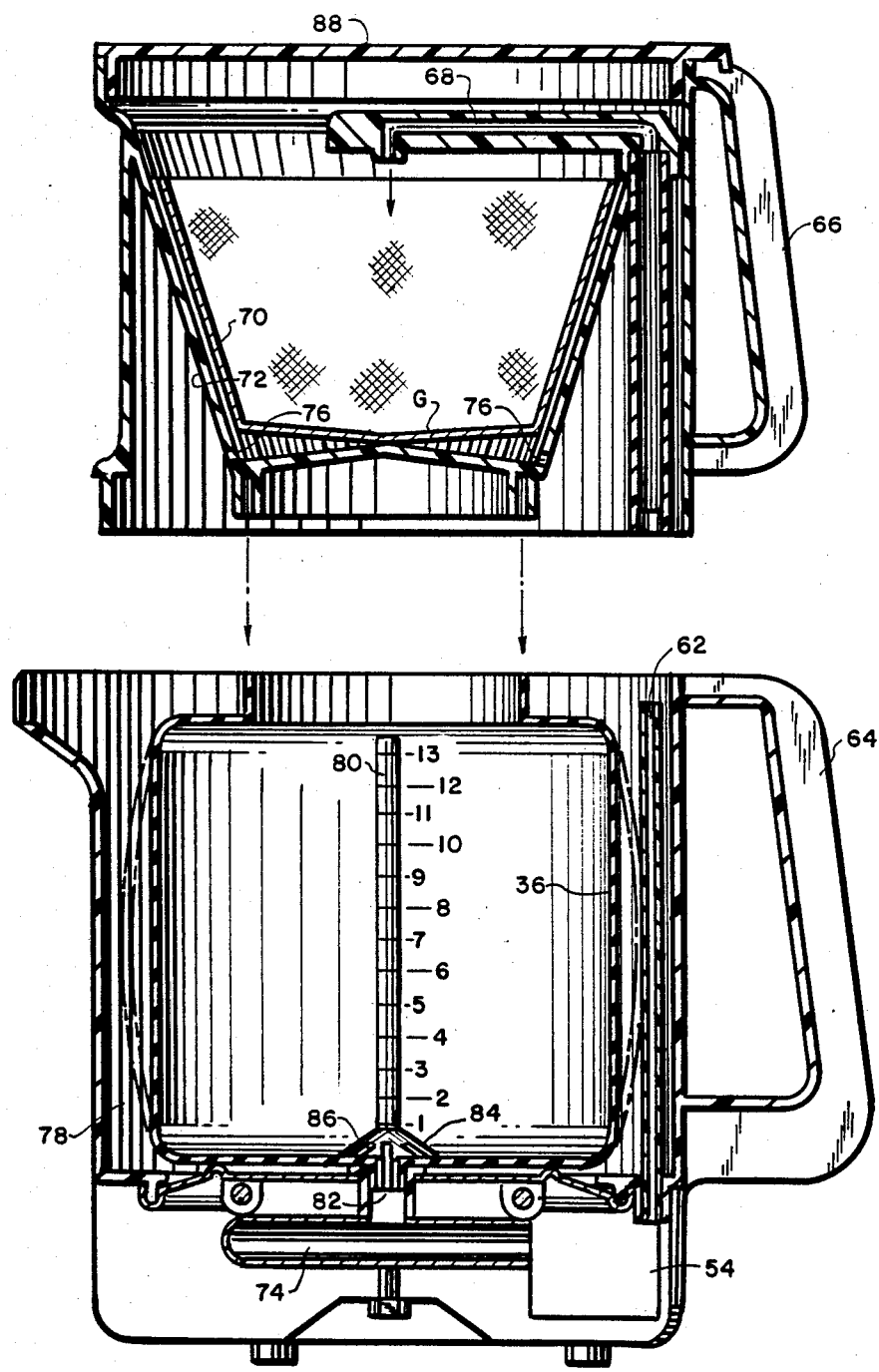
FIG. 3 is an alternate embodiment of the present invention shown in an exploded view and prior to assembly.
Figure 3A:
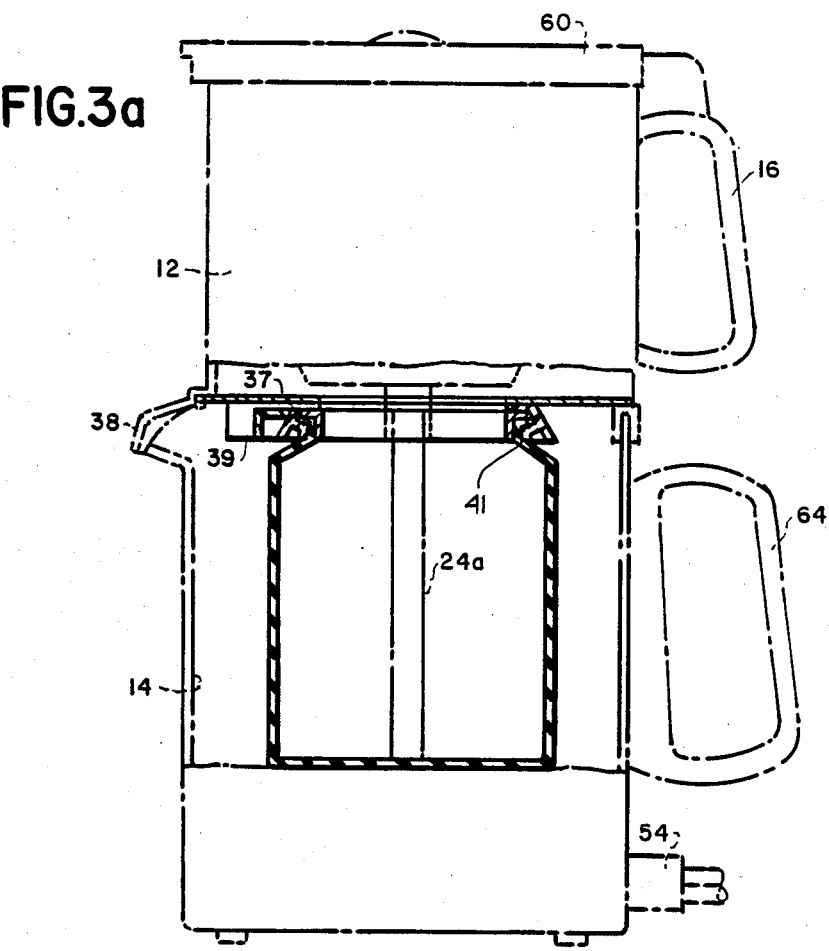
FIG. 3a is a partial sectional view of the expandable water container of the hot beverage maker showing the suspension arrangement within the beverage maker.
Figure 3B:
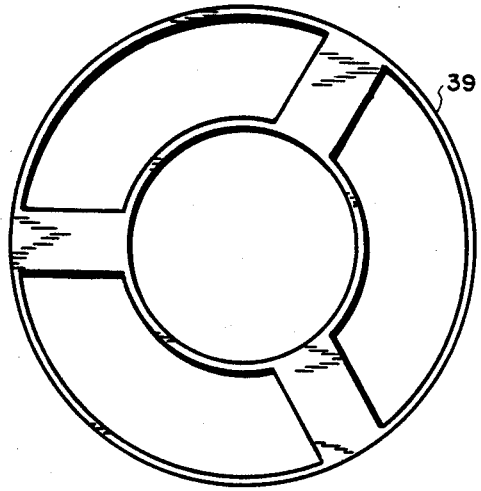
Figure 4:
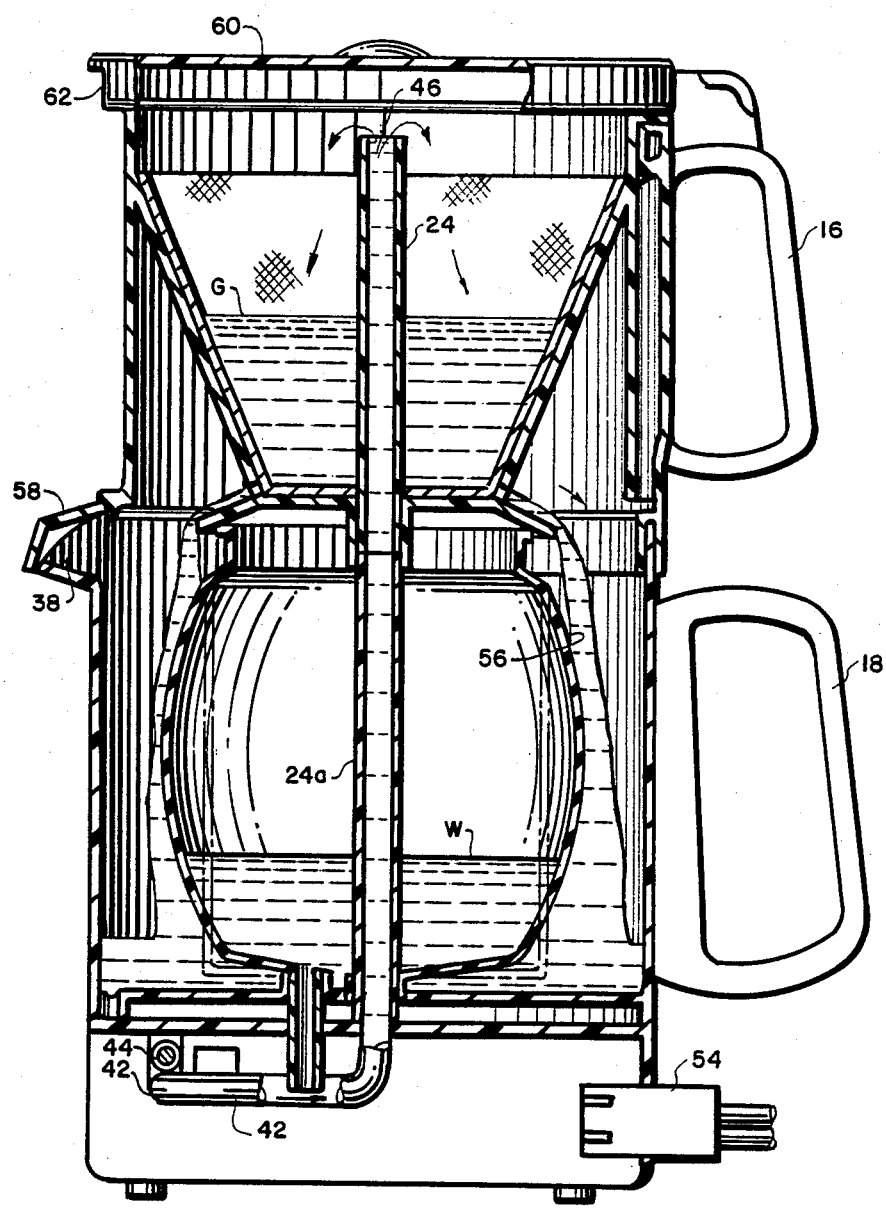
FIG. 4 is a sectional view, partly in elevation, of another embodiment of the present invention which is similar to the construction shown in FIG. 1.

The construction of the electric coffee maker, as shown in FIG. 3, varies from that shown in FIGS. 1 and 4 in that the water pump tube 62 does not project centrally through the water container in the upper compartment filter basket, but is positioned vertically adjacent to the handles 64 and 66 of the coffee maker and is provided with a swingable spigot, or nozzle 68, which can be swung out of the way of the filter basket 70 when the same is inserted in the upper compartment 72 and thereafter rotated to a position as shown in FIG. 3 wherein the hot water pumped up from the heating chamber 74 is expelled through the nozzle 68 through the coffee grinds G and thereafter through the openings 76 in the bottom of the coffee basket to flow into the annular area 78 surrounding the water container 36. It should be evident that the water container 36 is expandable laterally and therefore the water supply therein can be measured by means of measuring rod 80 which has calibrated graduations thereon for measuring the amount of water necessary for making the selected beverage amounts. It should be evident that the bottom of post 80 is fixed to the bottom of the water container 36 centrally thereof and above the water outlet 82 in the water container 36. Consequently, the base 84 of the post 80 is provided with openings 86 through which the water in the container can flow into the water heating chamber 74 through the water outlet 82. The post 80 also functions as a handle for lifting the water container 36 from the beverage or coffee maker when desired.

It will be noted in FIG. 3 that the upper compartment 12 can be easily and rapidly fitted over the lower compartment 14 whereby the disconnected pump up pipe 62 is connected to form a unitary conduit for pumping up hot water to the coffee basket. Furthermore, when the coffee is brewed it flows by gravity into the lower compartment 14. The upper compartment can be removed and the cover 88 can be placed over the open top of the lower compartment. Thus, the coffee maker has a normal appearance of a coffee pot but has the capability of making more cups of coffee than a standard coffee maker of the same size, and the coffee can be poured out of the spout 38 as required, and at the same time the cover maintains the elevated temperature in the lower compartment 14 since heat is prevented from escaping from the coffee maker's lower compartment.

Figure 5:
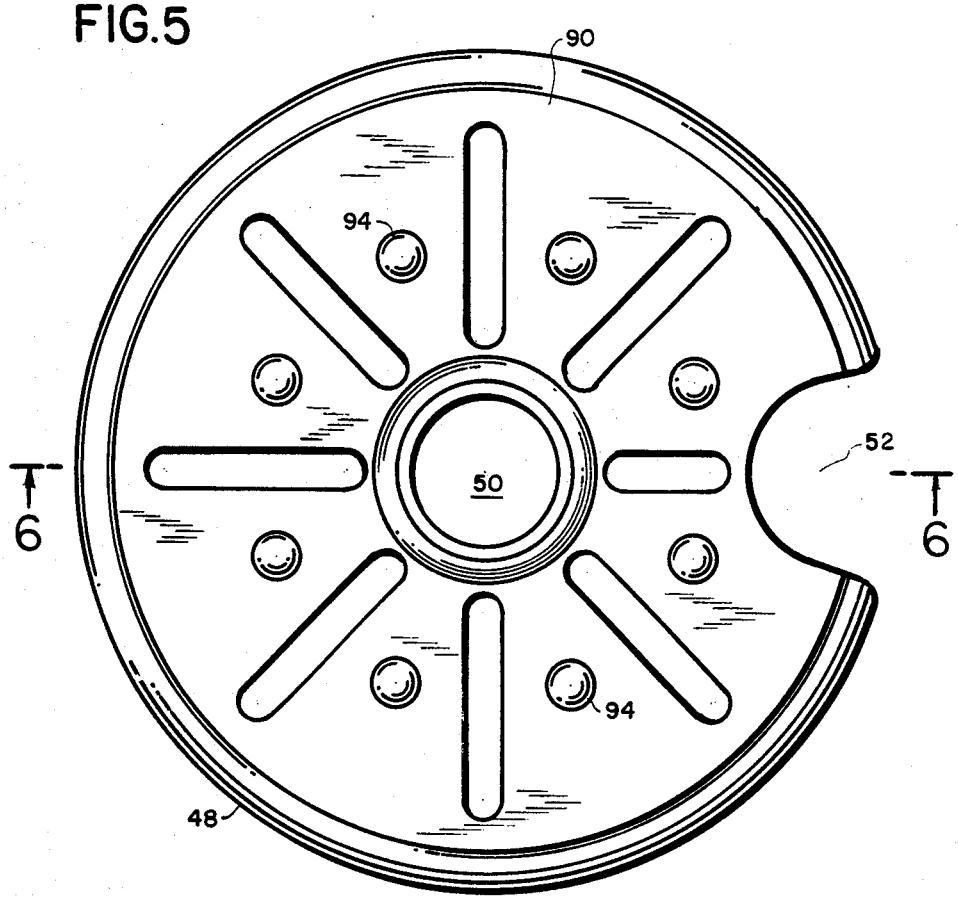
FIG. 5 is a top plan view of a detail of construction which is a non-conductive separator member for use in the beverage maker.
Figure 6:
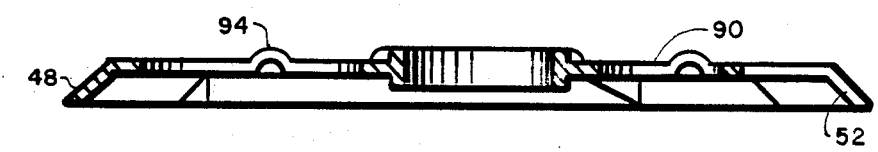
FIG. 6 is a view taken along the lines 6—6 of FIG. 5.

FIGS. 5 and 6 show a non-heat transferring separator which is circular in shape and has a semi-circular cutout 92 for receiving the pump up pipe 62. The plate 90 is also provided with a plurality of rounded projections 94 which are located in the circular pattern on the top of the plate 90 which are designed to engage the bottom surface of the water container 36.

Figure 8:
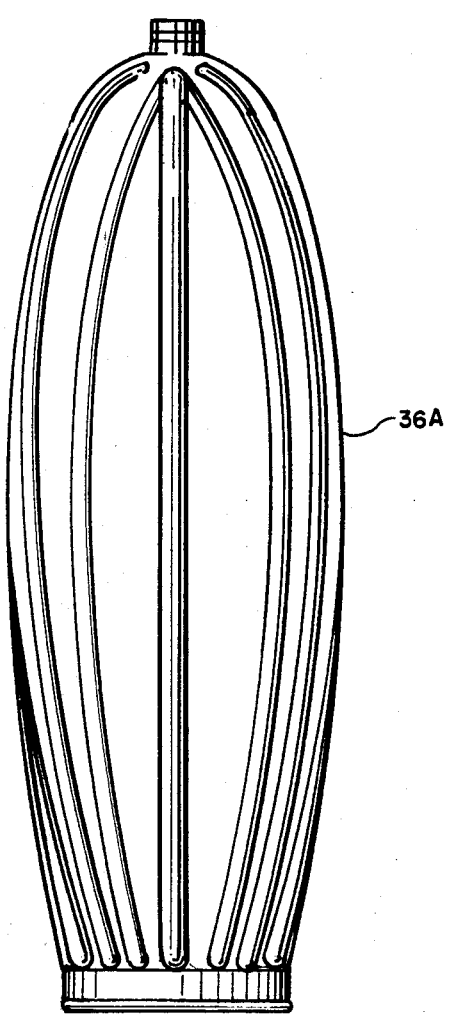
FIGS. 8, 9, 10 and 11 are various configurations of the expandable water container.
Figure 9:
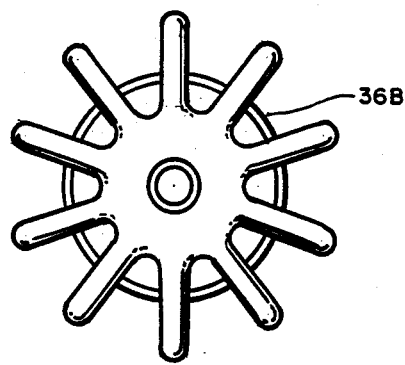
Figure 10:
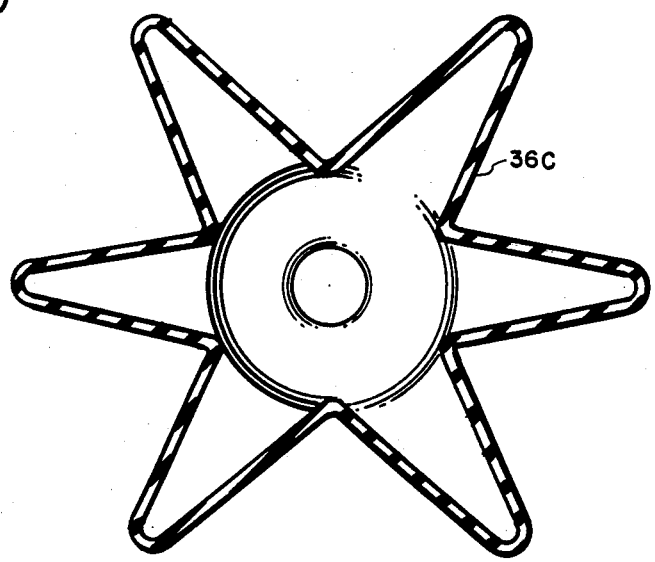
Figure 11:
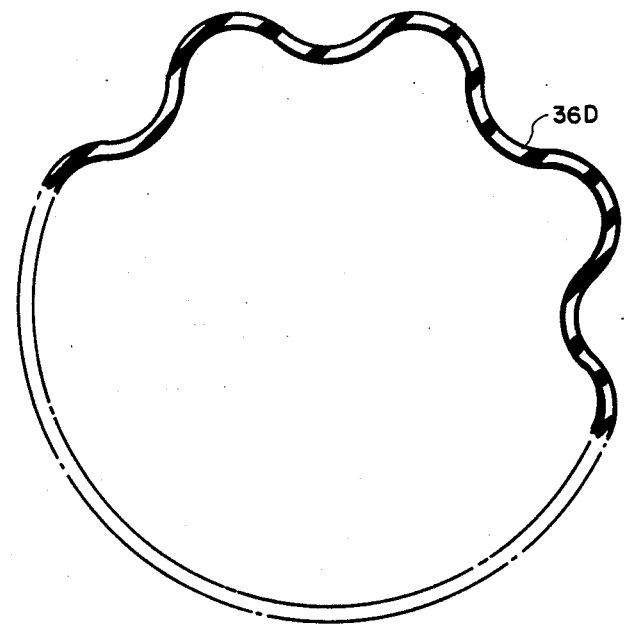

FIGS. 8 through 11 show different or various forms of expandable water containers or bags referred to as container 36A in FIG. 8, container 36B in FIG. 9, container 36C in FIG. 10, and container 36D in FIG. 11. The configuration of the water bag 36D in FIG. 11 is particularly adaptable for my novel coffee maker shown in FIG. 3, whereby about half the bag is expandable while the other half, which is located in the small space adjacent to the pump-up pipe 62, is not expandable to any great extent. For example, silicone rubber has been found to be an excellent sanitary material for expandable or resilient water containers to be utilized in a coffee maker. It should be evident that the use of an expandable container allows fabrication of a smaller coffee maker with the capability of expanding the number of coffee cups during a single use of the coffee brewing appartus.

It is especially advantageous in the present construction that the brewed coffee is not in contact with the water receptacle utilized for water to be heated and passed through the coffee for brewing purposes. It is therefore possible to expand the capacity of the coffee maker at any given time without making use of additional coffee makers.

Referring now to FIG. 4, an adjustable thermostat 54 is shown whereby the temperature of the heating element 44 can be adjusted after the coffee is brewed to maintain the brewed coffee at the proper temperature prior to consumption. Furthermore, as seen in FIG. 4, the water container 56 is of a different shape and configuration than that shown in FIG. 1. However, in all cases, the water containers 36, 56 etc. can be expanded, for example, from 6 cups to 10 cups within the same dimensioned coffee maker. Consequently, although the coffee maker in general is of a relatively small size, the capacity can be increased at will to a predetermined upper limit, if so desired.

Figure 7:
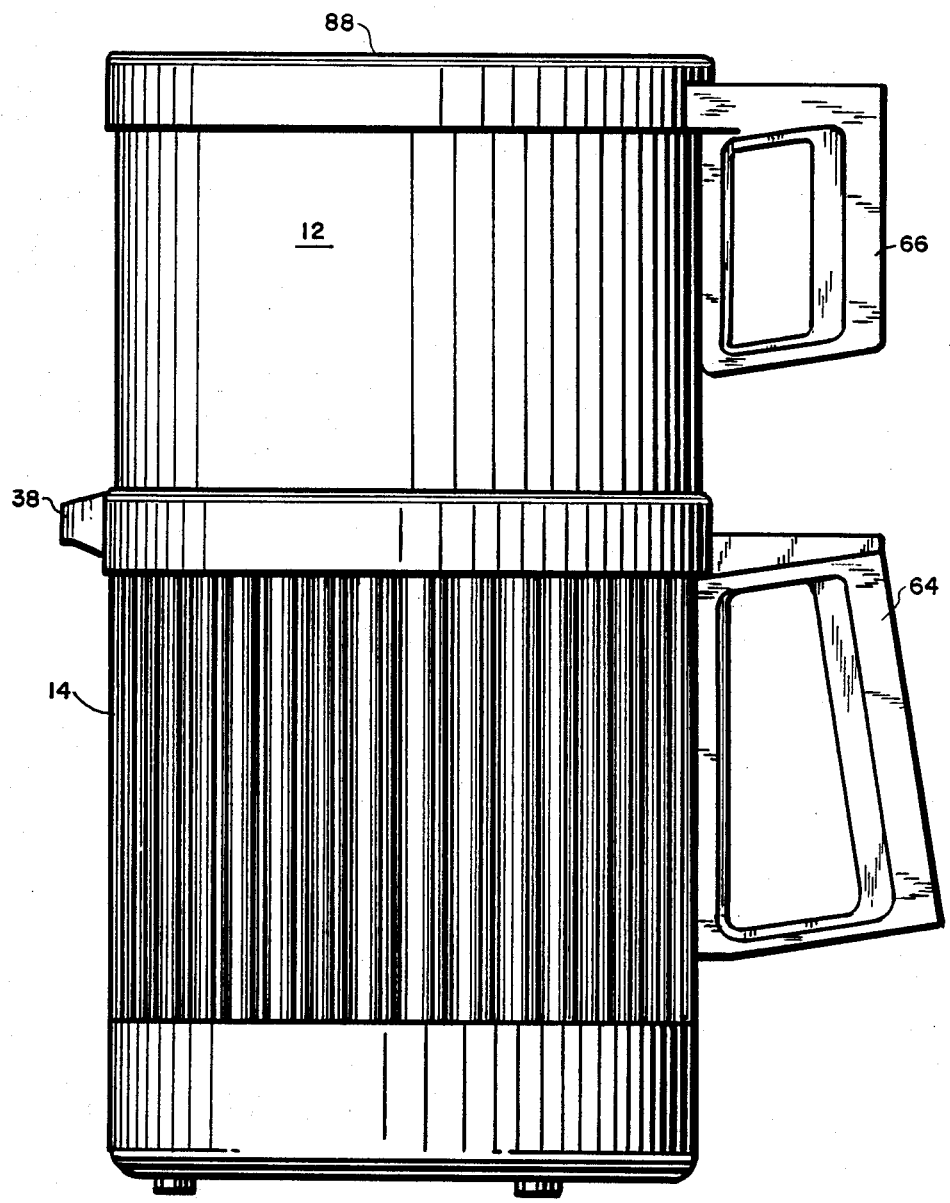
FIG. 7 is a side elevation view of the electrically operated coffee maker.

The overall appearance of the manufactured version of the present coffee maker is shown in FIG. 7 and comparing that appearance with the structure shown in FIG. 4, it should be noted that upon brewing the coffee the upper compartment, or receptacle, is provided with cover 58 that covers the spout 38 when the coffee is being brewed. Consequently, it aids in more rapidly and efficiently maintaining the coffee at the desired temperature. However, when the upper receptacle 12 is removed after the coffee is brewed, together with its filter arrangement, the cover for the upper receptacle can be removed and used to cover the lower receptacle to thereby prevent the coffee from being cooled down while the temperature is maintained at a selected level by means of the adjustable thermostat 54. In this connection, the cover 60 has an opening 62 for the spout 38 so that pouring of the coffee can be achieved without removing the cover 60.

It should be evident that the water containers 36, 56, as well as those shown in FIGS. 8–11, are washable and comply with the sanitary codes of the government. It also should be apparent that although separate upper and lower compartments for the present beverage maker are shown and described hereinbefore, it is within the scope of the present invention to provide a unitary apparatus wherein the upper and lower compartments are integral and not separable, however, the lower compartment will, in all instances, be provided with an expandable water compartment.

While the invention has been disclosed and described herein with reference to several embodiments, it is apparent that other variations and modifications may be made which fall within the true spirit and scope of the invention as defined in the following claims.

I claim:

1. A coffee maker provided with separable upper and lower compartments, said upper compartment including a coffee basket provided with holes therein, a filter in said basket for holding said coffee substance, said lower compartment having a flexible, expandable water container, means for heating said water, and means for conducting said heated water through said coffee to thereby drip through said holes in the coffee basket, and an annular dispensing container surrounding said expandable water container for receiving said brewed coffee that has accumulated therein after passing through said holes, said flexible container upon filling with water has the capability of expanding laterally into said annular dispensing container in order to accomodate more water than when said container is in its relaxed condition.

2. A hot beverage maker provided with upper and lower compartments, said upper compartment including a filter basket provided with apertures and a flavored substance therein, said lower compartment having a flexible, expandable water container, means in said lower compartment for heating said water, means for elevating said heated water to said upper compartment and conducting said heated water through said substance wherein flavor is extracted to form a beverage brew which drips through said apertures of the filter basket, and an annular dispensing container surrounding said water container from receiving said brewed beverage that has accumulated therein after passing through said apertures, said flexible container upon filling with water has the capability of expanding laterally into said annular dispensing container in order to accomodate more water than when said container is in its relaxed condition.

3. A beverage maker as claimed in claim 2 wherein said expandable water container is resilient.

4. A beverage maker as claimed in claim 3 wherein said water container is fabricated of rubber.

5. A beverage maker as claimed in claim 2 further comprising a spacer member positioned in said lower compartment between said heating means and said expandable water container preventing direct contact between said heating means and said water container.

6. A beverage maker as claimed in claim 2 wherein said means for elevating said heated water to said upper compartment is a vertically oriented pipe outside of said water container and having a swingable nozzle connected thereto and extending substantially perpendicular to said pipe.

7. A beverage maker as claimed in claim 6 wherein said vertically oriented pipe comprises two interfitting and separable sections, one of said sections being in the lower compartment while the other section is in the upper compartment.

8. A beverage maker as claimed in claim 2 wherein said means for elevating said heated water to said upper compartment is a pipe, said water container and filter basket being provided with aligned openings through which said pipe projects to discharge said heated water therefrom into said filter basket.

9. A beverage maker as claimed in claim 8 wherein said pipe is constituted of two interfitting and separable sections, one of said sections being in the lower compartment while the other section is in the upper compartment.

10. A hot beverage maker provided with separable upper and lower compartments, said upper compartment including a filter basket provided with apertures and said basket having a flavored substance therein, said lower compartment having a resilient water container which upon filling expands to accommodate more water than when said compartment is in its relaxed condition, said upper and lower containers having interfitting parts when assembled but which can be separated manually, means in said lower compartment for heating said water, means for elevating the water to said upper compartment and conducting said heated water through said flavored substance to form a beverage which drips through said apertures in the filter basket, and an annular container surrounding said water container for receiving said beverage that has accumulated therein after passing through said apertures.

11. A hot beverage maker as claimed in claim 10 further comprising an annular flange at the bottom of said upper compartment located adjacent and below said apertures so that the brewed beverage dripping through said apertures is deflected into said annular container.

* * * * *